United States Patent

[11] 3,589,369

| [72] | Inventor | Girts W. Alksnis<br>La Habra Heights, Calif. |
|---|---|---|
| [21] | Appl. No. | 802,444 |
| [22] | Filed | Feb. 26, 1969 |
| [45] | Patented | June 29, 1971 |
| [73] | Assignee | Resiflex Laboratory<br>Corina, Calif. |

[54] FORCEP CONSTRUCTION
2 Claims, 10 Drawing Figs.

[52] U.S. Cl.................................................. 128/354,
128/321, 81/43
[51] Int. Cl........................................................ A61b 17/28,
A61b 17/30, B25b 9/02
[50] Field of Search.............................................. 24/255 H,
255 P, 255 TV, 255 TZ, 259 HC; 81/43; 128/321,
322, 346, 354

[56] References Cited
UNITED STATES PATENTS

| 1,386,436 | 8/1921 | Smith | 128/354 X |
| 450,266 | 4/1891 | Truax | 128/346 |
| 985,755 | 2/1911 | Gilbert | 81/43 X |
| 1,725,173 | 8/1929 | Anderson | 128/321 |
| 2,638,103 | 5/1953 | Fuscaldo | 24/255 UX |

*Primary Examiner*—Channing L. Pace
*Attorney*—Miketta, Glenny, Poms and Smith

ABSTRACT: A one piece integral forcep construction including spaced-apart forcep arms of V cross section faced in the same direction for pressing towards each other into nested relation and for commencing initial pressure contact at corresponding apices of end portions of the nested arms and progressively increasing pressure area contact as the nested arms are brought together.

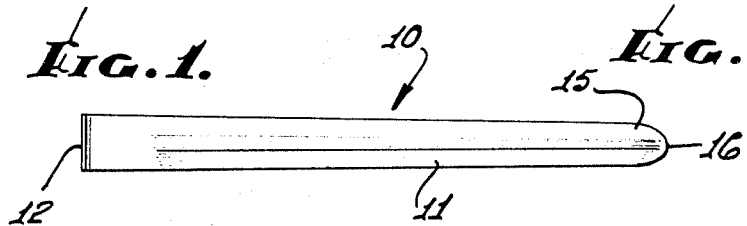
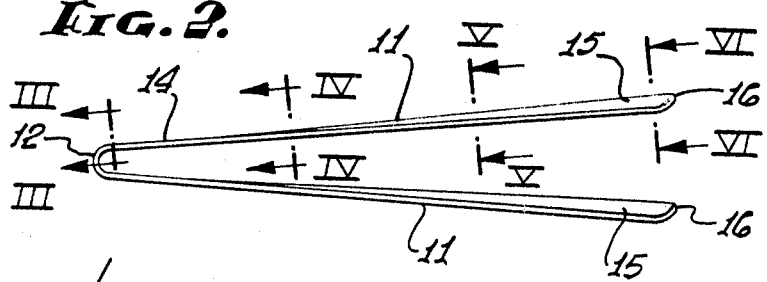
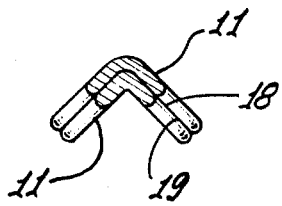
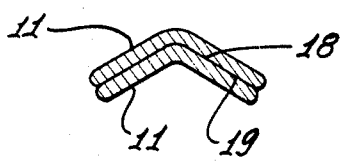
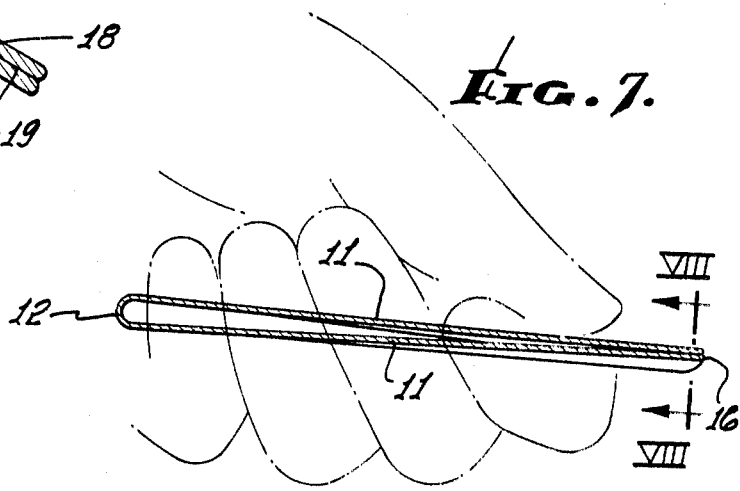
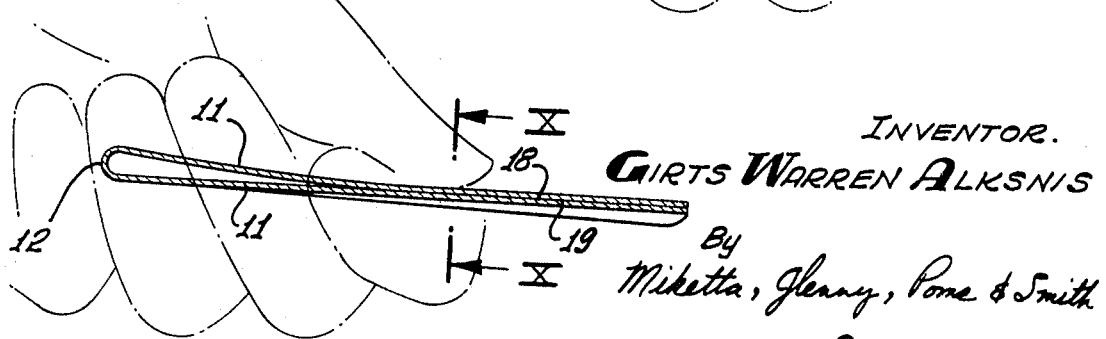
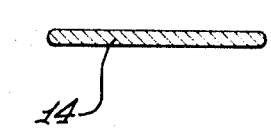
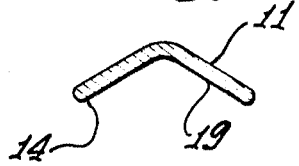
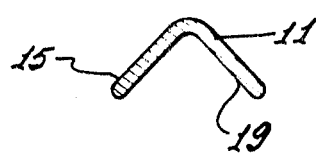
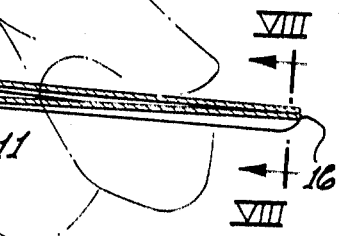
INVENTOR.
GIRTS WARREN ALKSNIS
BY
Miketta, Glenny, Poms & Smith
ATTORNEYS.

FORCEP CONSTRUCTION

BACKGROUND OF THE INVENTION

Prior proposed forcep constructions have included many various shapes and normally biased apart arms. Such prior forceps have included gripping faces of relatively small area with teeth or serrations to prevent slippage of an article grasped. Since the surface area of such gripping faces was usually small, pressure applied by said gripping faces would often damage or tear soft materials such as cotton, gauze and the like used in surgery and treatment of wounds. Such piercing and penetration of such articles was not desired.

In addition, grasping of sutures, threads, or knots used in surgery by such serrated roughened or grooved gripping faces often resulted in the fine thread or suture being temporarily caught and held in one of the grooves so that release of the suture or thread was prevented. Such retention of thread on a forcep was not desirable.

Prior proposed forcep constructions often included jaws of various shapes having relatively small gripping areas which resulted in crushing or deformation of some objects if care was not exercised. Moreover, such prior proposed forceps with small gripping areas often did not provide adequate control when handling small objects such as jewels. In many prior forceps, the shape and design of the forcep presented many corners, grooves, cavities and the like, all of which tended to collect dirt and to be difficult to clean for use in sterile environments.

The present invention contemplates a novel inexpensive readily manufactured forcep construction which obviates difficulties of prior forceps and which may be readily used without damage to the article being gripped and held.

An object of the present invention is to disclose and provide a forcep construction having spaced-apart forcep arms of a configuration which facilitates guiding nesting relation as the arms are pressed towards each other for gripping an article.

Another object of the present invention is to disclose and provide a forcep construction wherein one of the forcep arms may be utilized in such a manner as to hold and retain a movable article such as a jewel and to facilitate deposit or positioning of said jewel at a precise location.

Still another object of the present invention is to disclose and provide a novel forcep construction which may be readily manufactured from flat stock without special manufacturing processes.

Among other objects of the present invention are the provision of a novel forcep construction wherein the forcep arms are designed to register or index without fail; smooth surfaces are used throughout the forcep construction while still achieving desired gripping action and avoiding small cavities such as between teeth which become difficult to clean and sterilize, and the forcep readily nests with other like forceps for permitting storage of a quantity of forceps in a minimum space.

Other objects and advantages of the present invention will be readily apparent from the following description of the drawings in which an exemplary embodiment of the invention is shown. In the drawings:

FIG. 1 is a top plan view of a forcep construction embodying this invention.

FIG. 2 is a side elevational view of the forcep shown in FIG. 1.

FIGS. 3, 4, 5, and 6 are transverse sectional views taken in the planes indicated respectively by lines III–III, IV–IV, V–V, V–V VI–VI of FIG. 2.

FIG. 7 is a longitudinal sectional view taken in a plane longitudinally bisecting the forcep of FIG. 1 and showing the forcep in initial closed position, a hand being shown in phantom lines.

FIG. 8 is a transverse sectional view taken in the plane indicated by line VIII–VIII of FIG. 7.

FIG. 9 is a view taken in the same plane as FIG. 7 and showing the forcep in fully closed position.

FIG. 10 is a sectional view taken in the plane indicated by line X–X of FIG. 9.

A forcep construction generally indicated at 10 embodying the present invention generally comprises a pair of spaced-apart forcep arms 11, 11 and means 12 resiliently connecting adjacent ends of said arms 11 for maintaining said arms in normally biased spaced-apart relationship.

Forcep construction 10 may be made from a suitable material such as stainless steel which is resistant to corrosion in the presence of liquids and articles normally used in a hospital in treatment of patients particularly including surgical patients. Forcep construction 10 is readily formed from a single forcep member 14 of flat stock and of uniform width and thickness throughout its length. Opposite end portions 15 of member 14 may be provided with a curved or arcuate end edge 16 to provide a relatively blunt end to minimize damage or injury when end portions 15 are used to grip an article or material within or without a patient's body.

Forcep member 14, while in flat stock form, may be deformed along arms 11 into a longitudinally gradually increasing V cross section. Each V section arm 11 may be formed with angles varying from 150° adjacent the midportion of flat member 14 to about 90° at end portions 15. It will be noted that when the flat forcep member 14 is formed, one arm 11 has its V-section facing upwardly while its companion or mating arm 11 has its V-section facing in the opposite direction or downwardly. Thus when the member 14 is bent about its midportion 12, the V-section arms will be brought together with the exterior surface 18 of one arm 11 being receivable within and in opposed relation with interior surface 19 of the other arm 11. Resilient connecting means 12 thus forms a hinge portion for arms 11.

The integral one piece construction of forceps 10 with smooth uninterrupted surfaces 18 and 19 provide V-section end portions 15 which may be moved together into initial pressure contact commencing with contact at the apices of the V-section configurations of end portions 15 and at end edges 16. Thus gripping contact with small articles or threads at the tip end of the forcep 10 may be readily achieved. It will also be apparent that as the forcep arms are pressed more closely together that contact area between surfaces 18 and 19 increases towards hinge portion 12. The flexibility and resiliency of arms 11 will permit such contact to progressively increase for about one-half the length of forcep arms 11. Thus gripping area of the forcep arms may be selectively varied according to the shape of the article being grasped by forcep 10.

The forcep arms 11 when pressed together will automatically move into registry with each other, the nesting of the V-section arms progressively along their length facilitating such indexing and registering. The V-section configuration of the arms also provides structural strength to the arms so that they are not readily deformed out of their cooperable relationship.

When it is desired to employ forcep 10 in the handling of small minute articles, such as precious stones and jewelry, the forcep may be turned upside down from the position shown in FIG. 1 so that the lower forcep arm 11 has its V-section facing upwardly and forming a groove or trough. Thus any article which is picked up by the forceps will be readily retained by the V-section walls of the bottom arm 11. When the article is to be precisely located at a selected place the upturned V-section of the bottom arm also facilitates its placement by permitting the article to controllably move longitudinally from the V-section groove at the apex of bottom edge 16.

Progressive increasing of the angle of the V-section tapers the width of the forcep towards the gripping end and also increases the included angle between walls of the V-section. Thus a suture or thread grasped transversely of the arms is bent or kinked sufficiently to firmly hold and retain the suture. Release of the suture is clean and free since the smooth surfaces do not retain or interfere with such release. Articles such as gauze pads may be grasped over a substantial area of the smooth surfaces of arms 11; piercing, tearing, or disruption of the gauze surface is avoided and prevented.

Modifications or changes in the forcep construction described above coming within the scope of the appended claims are embraced thereby.

I claim:

1. A forcep construction for grasping and holding under virtually uniform pressure articles of different shape and construction, comprising in combination:

a one piece forcep member of resilient flat stock material;

said member including a pair of arms normally in spaced relation, a hinge portion integrally interconnecting said arms, said hinge portion being of selected radius;

each of said arms including an angle cross section progressively changing from slightly less than 180° adjacent said hinge portion to about 90° at the end portion of each arm;

said angle cross section arms facing in the same direction for nesting one arm within the other arm whereby the exterior surface of one angle section is pressable into close proximity and engagement with the interior surface of the other arm for firmly holding an article between said surfaces.

2. A forcep construction as stated in claim 1 wherein said forcep arms are pressable toward each other to provide nested contact between said angle cross section of said arms for about one-third the length of said arms.